United States Patent
Gervais et al.

(10) Patent No.: US 10,217,032 B2
(45) Date of Patent: Feb. 26, 2019

(54) METHOD FOR CHOOSING A COMPRESSION ALGORITHM DEPENDING ON THE IMAGE TYPE

(71) Applicant: Jean-Claude Colin, Versailles (FR)

(72) Inventors: Than Marc-Eric Gervais, Paris (FR); Bruno Loubet, Paris (FR); Nicolas Bessou, Sartrouville (FR); Yves Guimiot, Conflans Sainte Honorine (FR); Mickael Petitfils, Mitry Mory (FR); Sebastien Roques, Paris (FR)

(73) Assignee: Jean-Claude Colin, Versailles (FR)

( * ) Notice: Subject to any disclaimer, the term of this patent is extended or adjusted under 35 U.S.C. 154(b) by 0 days.

(21) Appl. No.: 15/328,772

(22) PCT Filed: Jul. 9, 2015

(86) PCT No.: PCT/FR2015/000142
§ 371 (c)(1),
(2) Date: Jan. 24, 2017

(87) PCT Pub. No.: WO2016/012667
PCT Pub. Date: Jan. 28, 2016

(65) Prior Publication Data
US 2017/0213107 A1    Jul. 27, 2017

(30) Foreign Application Priority Data

Jul. 24, 2014 (FR) .................................. 14 01695

(51) Int. Cl.
| | | |
|---|---|---|
| G06K 9/36 | (2006.01) | |
| G06K 9/62 | (2006.01) | |
| H04N 19/63 | (2014.01) | |
| H04N 19/12 | (2014.01) | |
| H04N 19/136 | (2014.01) | |

(Continued)

(52) U.S. Cl.
CPC ........... *G06K 9/628* (2013.01); *G06K 9/4652* (2013.01); *G06K 9/6276* (2013.01); *H04N 1/642* (2013.01);
(Continued)

(58) Field of Classification Search
CPC .... G06K 9/628; G06K 9/4652; G06K 9/6267; H04N 19/12; H04N 19/186; H04N 19/182; G06T 2207/10024; G06T 2207/20208
See application file for complete search history.

(56) References Cited

U.S. PATENT DOCUMENTS 7,457,360 B2 * 11/2008 Otsuka .................. H04N 19/15
375/240.04
2004/0179742 A1    9/2004 Li
(Continued)

OTHER PUBLICATIONS

Xin Li et al: "Block-based segmentation and adaptive coding for visually lossless compression of scanned documents", Proceedings 2001 International Conference on Image Processing. ICIP 2001— Thessaloniki, Greece, Oct. 7-10, 2001; [International Conference on Image Processing], Institute of Electrical and Electronics Engineers, New York, NY, vol. 3, Oct. 7, 2001 (Oct. 7, 2001), pp. 450-453, XP010563380, ISBN: 978-0-7803-6725-8, DOI: 10.1109/ICIP.2001. 958148.

(Continued)

*Primary Examiner* — Ali Bayat
(74) *Attorney, Agent, or Firm* — Young & Thompson

(57) ABSTRACT

A method for compressing an image, includes:
  calculating a level of hues of the image over at least all of one layer of the image;
  depending on the type of hues of the representative layer, classifying the image in one of the following three classes:
  a first class if the image is of a graphics type;
(Continued)

a second class if the image is of a highly contrasted type;
a third class if the image is of a low-contrasted type; and,
choosing a compression processing type depending on the class of the image:
difference processing, if the image is of the first class;
frequency processing, if the image is of the third class; and,
if the image is of the second class:
for lossless or low-loss compression, preferably using difference processing, and,
in the other cases preferably using frequency processing.

20 Claims, 3 Drawing Sheets

(51) Int. Cl.
  *H04N 19/182*    (2014.01)
  *H04N 19/186*    (2014.01)
  *G06K 9/46*    (2006.01)
  *H04N 1/64*    (2006.01)
  *H04N 19/593*    (2014.01)
(52) U.S. Cl.
  CPC .......... *H04N 19/12* (2014.11); *H04N 19/136* (2014.11); *H04N 19/182* (2014.11); *H04N 19/186* (2014.11); *H04N 19/593* (2014.11); *H04N 19/63* (2014.11)

(56) References Cited

U.S. PATENT DOCUMENTS

| | | | |
|---|---|---|---|
| 2007/0133017 A1* | 6/2007 | Kobayashi | G06T 5/009 358/1.9 |
| 2011/0147457 A1* | 6/2011 | Cha | G01N 33/48771 235/438 |
| 2013/0003086 A1* | 1/2013 | Mebane | H04N 1/6027 358/1.9 |

OTHER PUBLICATIONS

Wenpeng Ding et al: "Block-based Fast Compression for Compound Images", Proceedings / 2006 IEEE International Conference on Multimedia and Expo, ICME 2006 : Jul. 9-12, 2006, Hilton, Toronto, Toronto, Ontario, Canada, IEEE Service Center, Piscataway, NJ, Jul. 1, 2006 (Jul. 1, 2006), pp. 809-812, XP031032959, ISBN: 978-1-4244-0366-0.

Shuhui Wang et al: "United coding for compound image compression", Image and Signal Processing (CISP), 2010 3rd International Congress on, IEEE, Piscataway, NJ, USA, Oct. 16, 2010 (Oct. 16, 2010), pp. 566-570, XP031809666, ISBN: 978-1-4244-6513-2.

Lin et al: "Compound Image Compression for Real-Time Computer Screen Image Transmission", IEEE Transactions on Image Processing, IEEE Service Center, Piscataway, NJ, US, vol. 14, No. 8, Aug. 1, 2005 (Aug. 1, 2005), pp. 993-1005, XP011136219, ISSN: 1057-7149, DOI: 10.1109/TIP.2005.849776.

International Search Report, dated Oct. 23, 2015, from corresponding PCT Application.

* cited by examiner

METHOD FOR CHOOSING A COMPRESSION ALGORITHM DEPENDING ON THE IMAGE TYPE

The images can belong to very different types. In particular, there are images that are highly "graphic" comprised of clear lines, and images that are much more "natural" comprised of many gradients of colours.

Each compression algorithm uses its own data representation. For example, the compression via wavelets separates the image into successive sub-images with frequency transformations, while certain codecs, in particular developed by the applicant take the differences between the numerical values of the image.

The invention therefore proposes to define a codec that automatically selects at encoding the best representation of the data using the type of image data, and carries out the inverse transform at decompression using information contained in the file header.

Each one of the types of algorithms is more or less adapted to certain types of images. In particular, frequency representations model low-contrast images very well while representations via differences model graphic or highly contrasted images well.

Each one of the methods (Differences/Wavelets) can be used in loss or lossless mode. The transformation is applied to each one of the layers separately. On the other hand, the choice of the type of transformation is taken on the layer considered to be the most representative, for example the layer Y in the case of an image that has been subjected beforehand to a YCbCr transform, or the layer that best represents the light intensity of an image in the case of a lossless colorimetric transformation.

When the algorithm used is a transformation via wavelets, this transformation can be carried out by a specific implementation of wavelets and binary encoding, or using standard formats such as Jpeg2000 or PGF. In the following example, and in a non-limiting manner, the wavelet formats used will be Jpeg2000 and PGF.

When the algorithm used is a transformation via differences, the transformation via differences consists in taking the difference between the values of two adjacent pixels over the same layer, then in quantifying this difference by a predefined factor Q. In order to not propagate the error, the difference is taken with respect to a decompressed value defined hereinbelow. In the same way, if two directions of differences are possible, the direction that would generate the lowest difference, using decompressed values, is determined. The difference at compression and decompression is then calculated.

In a more detailed manner, this method of encoding is carried out in the following way:

A matrix to be transformed is considered, representing a layer of an image in 2 dimensions. The following nomenclature is adopted:

Vij is an initial value of the matrix, for which i represents the line number and j the column number. Cij represents the corresponding compressed value, and Dij the corresponding decompressed value. As such, for a 5×5 matrix, the following is the distribution of the values:

| V11 | V12 | V13 | V14 | V15 | C11 | C12 | C13 | C14 | C15 | D11 | D12 | D13 | D14 | D15 |
| V21 | V22 | V23 | V24 | V25 | C21 | C22 | C23 | C24 | C25 | D21 | D22 | D23 | D24 | D25 |
| V31 | V32 | V33 | V34 | V35 | C31 | C32 | C33 | C34 | C35 | D31 | D32 | D33 | D34 | D35 |
| V41 | V42 | V43 | V44 | V45 | C41 | C42 | C43 | C44 | C45 | D41 | D42 | D43 | D44 | D45 |
| V51 | V52 | V53 | V54 | V55 | C51 | C52 | C53 | C54 | C55 | D51 | D52 | D53 | D54 | D55 |

Take a numerical example with the following numerical values for each Vij, as well as a quantification coefficient Q=3:

| 0 | 0 | 0   | 0   | 0 |
| 0 | 0 | 255 | 253 | 0 |
| 0 | 0 | 255 | 253 | 0 |
| 0 | 0 | 255 | 253 | 0 |
| 0 | 0 | 255 | 253 | 0 |

The differences are taken line by line, from the first to the last, from left to right. The first value V11 is retained as is.

In the first horizontal line, for each value V1j, the difference is taken with respect to the decompressed value located to the left thereof D1j−1, then it is quantified and rounded. As such:

$D11=C11=V11=0;$ $C12=\text{ROUND}((V12-D11)/Q)=\text{ROUND}((0-0)/3)=0$ $D12=\text{ROUND}(D11+(C12*Q))=\text{ROUND}(0+0*3)=0$ And so on until the end of the line.

For each one of the following lines, the compressed value Ci1 of the first box of said line is calculated by taking a difference between the current value Vi1 and the decompressed value of the line immediately above Di−11:

This will therefore yield, for example for the $2^{nd}$ line:

$C21=\text{ROUND}((V21-D11)/Q)=\text{ROUND}((0-0)/3)=0$ $D21=\text{ROUND}(D11+(C21*Q))=\text{ROUND}(0+(0*3))=0$ For each one of the following values of the line, for each value Vij the difference horizontally is calculated if (Di−1 j−Di−1 j−1) is less as an absolute value than (Di j−1−Di−1 j−1), and the difference is calculated vertically in the opposite case.

As such, for the value V22:
The absolute value of (D12-D11) is 0;
The absolute value of (D21-D11) is 0;
As the two values are equal, the vertical difference is chosen;
The compressed value is therefore calculated: $C22=\text{ROUND}((V22-D12)/Q)=\text{ROUND}((0-0)/3)=0$
Then the decompressed value is calculated: $D22=\text{ROUND}(D12+(C22*Q))=\text{ROUND}(0+0*3)=0$
As such, for the value V23:
The absolute value of (D13-D12) is 0;
The absolute value of (D22-D12) is 0;
As the two values are equal, the vertical difference is chosen;

The compressed value is therefore calculated:
C23=ROUND((V23−D13)/Q)=ROUND((255−0)/3)= 85
Then the decompressed value is calculated:
D23=ROUND(D13+(C23*Q))=ROUND(0+85*3)= 255
As such, for the value V24:
The absolute value of (D14-D13) is 0;
The absolute value of (D23-D13) is 255;
As the value of the first difference (horizontal) is the smaller, the horizontal difference is chosen;
The compressed value is therefore calculated:
C24=ROUND((V24−D23)/Q)=ROUND((253−255)/3)=−1
Then the decompressed value is calculated:
D24=ROUND(D23+(C24*Q))=ROUND(255−1*3)= 252

Through iteration, the following compressed and decompressed values are obtained for this matrix:

| V11 | V12 | V13 | V14 | V15 | C11 | C12 | C13 | C14 | C15 | D11 | D12 | D13 | D14 | D15 |
|---|---|---|---|---|---|---|---|---|---|---|---|---|---|---|
| V21 | V22 | V23 | V24 | V25 | C21 | C22 | C23 | C24 | C25 | D21 | D22 | D23 | D24 | D25 |
| V31 | V32 | V33 | V34 | V35 | C31 | C32 | C33 | C34 | C35 | D31 | D32 | D33 | D34 | D35 |
| V41 | V42 | V43 | V44 | V45 | C41 | C42 | C43 | C44 | C45 | D41 | D42 | D43 | D44 | D45 |
| V51 | V52 | V53 | V54 | V55 | C51 | C52 | C53 | C54 | C55 | D51 | D52 | D53 | D54 | D55 |
| 0 | 0 | 0 | 0 | 0 | 0 | 0 | 0 | 0 | 0 | 0 | 0 | 0 | 0 | 0 |
| 0 | 0 | 255 | 253 | 0 | 0 | 0 | 85 | −1 | −84 | 0 | 0 | 255 | 252 | 0 |
| 0 | 0 | 255 | 253 | 0 | 0 | 0 | 0 | 0 | 0 | 0 | 0 | 255 | 252 | 0 |
| 0 | 0 | 255 | 253 | 0 | 0 | 0 | 0 | 0 | 0 | 0 | 0 | 255 | 252 | 0 |
| 0 | 0 | 255 | 253 | 0 | 0 | 0 | 0 | 0 | 0 | 0 | 0 | 255 | 252 | 0 |

When Q=1, this transformation is lossless. When Q>1, it is with losses.

This transformation of data is called "APE"

Once this "APE" transformation has been carried out, an RLE (Run-Length Encoding) transformation is applied then a compression using the Bzip2 algorithm on the data obtained. The compression chain is then as follows, for each one of the layers of the image: APE, RLE, Bzip In an embodiment, two methods of compression via wavelets are applied, for example Jpeg2000 and PGF, as well as the compression chain APE, RLE, Bzip, described hereinabove, over 3 different images:

The effectiveness of each one of the methods (APE/RLE/Bzip, Jpeg2000, PGF) is represented using a so-called PSNR curve, which represents the quality of the restored image after compression then decompression. Each encoding parameter corresponds to a file size and a value of quality referred to as PSNR, between 0 and 100. The PSNR is a standard measurement, here calculated over the layer Y, with 100 being the best quality possible and corresponds to a lossless compression. It is considered that a compression has better performance than another when, at the equivalent size, it has a better PSNR, or when with an equivalent PSNR, the size is less.

Figure 1:
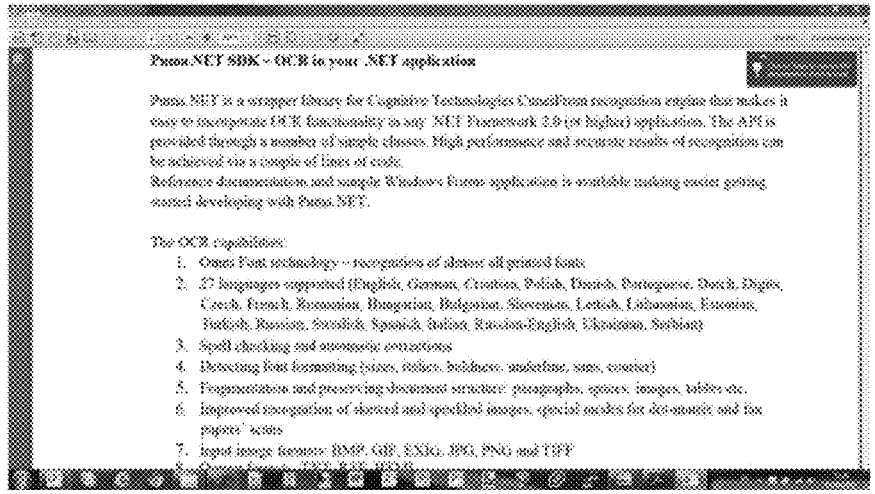
FIG. 1 is a screen copy, containing much text on a white background, and represents an example of an image of the "graphics" type.
Figure 4:
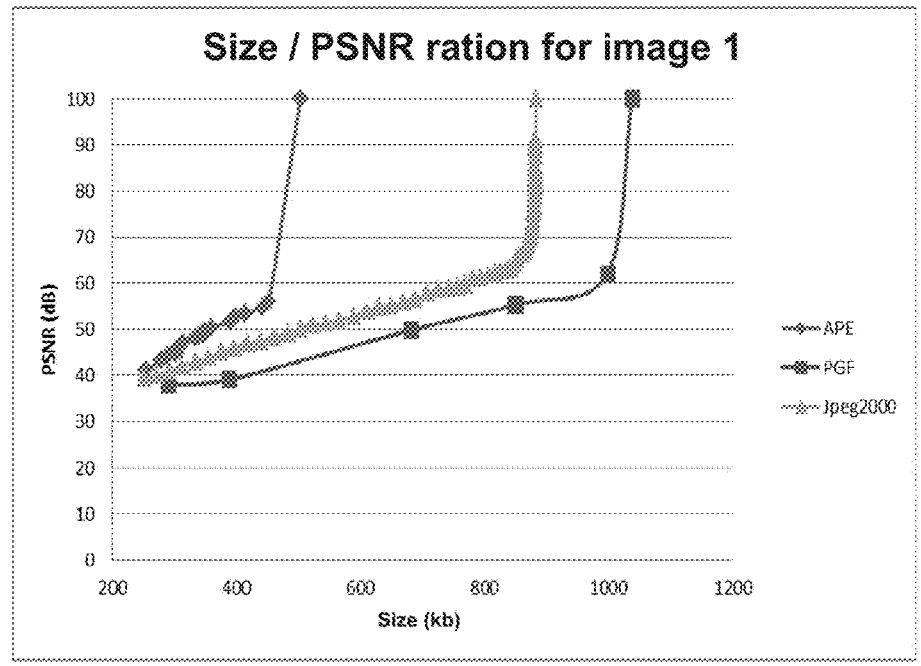

FIG. 4 and the table hereinbelow show the change in the PSNR according to the image size for the image shown in FIG. 1.

| Algorithm | Programme/ Parameters/ Quantification factor | Size (kb) | PSNR |
|---|---|---|---|
| APE + RLE + zlib | Q = 80 | 502 | 100 |
| PGF | PGFConsole, −q 0 | 1038 | 100 |
| Jpeg2000 | OpenJpeg, image_to_j2k, no parameter | 882 | 100 |

Figure 2:
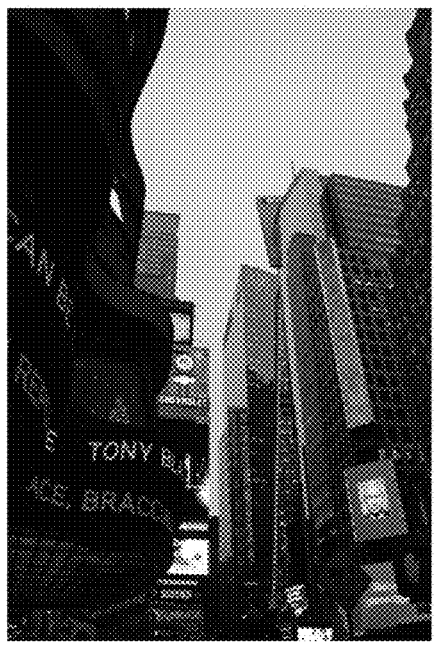
FIG. 2 is a photograph in town with high contrasts between the buildings and the sky, the lights, etc. It represents an example of an image of the "high contrast" type.
Figure 5:
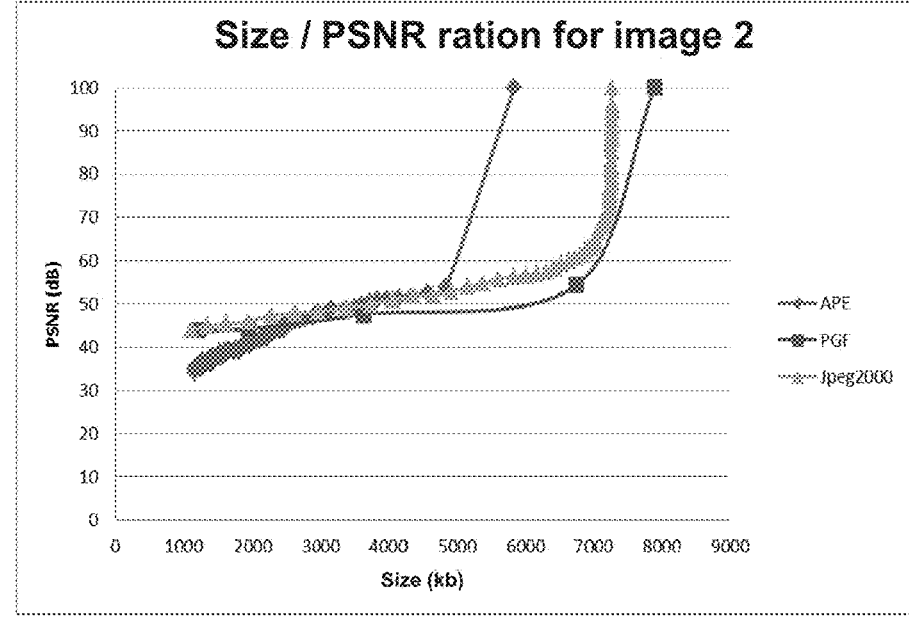

FIG. 5 and the table hereinbelow show the change in the PSNR according to the size of the image for the image shown in FIG. 2.

| Algorithm | Programme/ Parameters/ Quantification factor | Size (kb) | PSNR |
|---|---|---|---|
| APE + RLE + zlib | Q = 1 | 5832 | 100 |
| PGF | PGFConsole, −q 0 | 7893 | 100 |
| Jpeg2000 | OpenJpeg, image_to_j2k, no parameter | 7266 | 100 |
| APE + RLE + zlib | Q = 22 | 1155 | 34 |
| PGF | PGFConsole, −q 0 | 1212 | 43 |
| Jpeg2000 | OpenJpeg, image_to_j2k, no parameter | 1112 | 44 |

Figure 3:
FIG. 3 is a photograph of an airshow that contains many gradients of colours. It represents an example of an image of the "low contrast" type.
Figure 6:
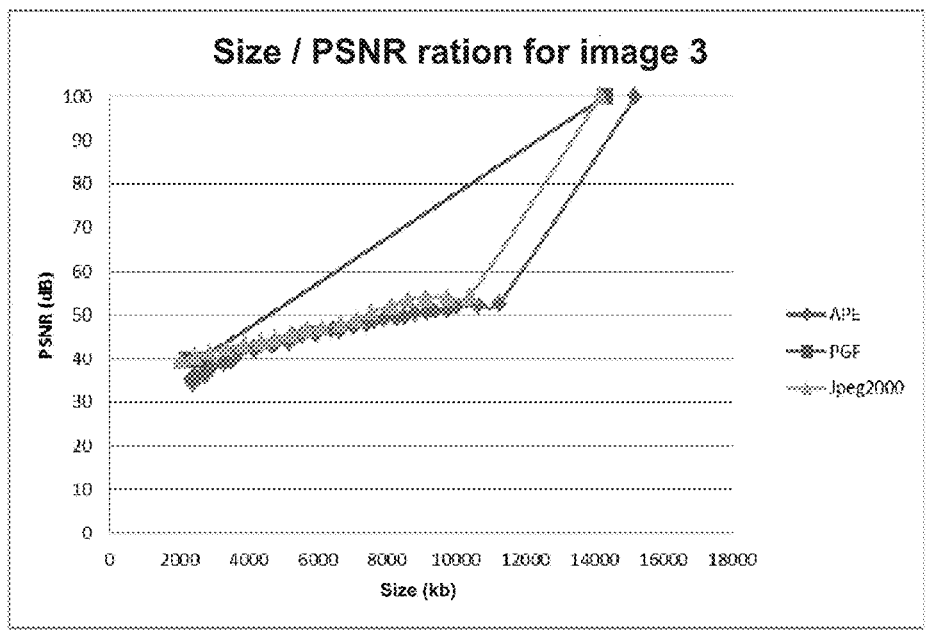

FIG. 6 and the table hereinbelow show the change in the PSNR according to the size of the image for the image shown in FIG. 3:

| Algorithm | Programme/ Parameters/ Quantification factor | Size (kb) | PSNR |
|---|---|---|---|
| APE + RLE + zlib | Q = 1 | 15175 | 100 |
| PGF | PGFConsole, −q 0 | 14303 | 100 |
| Jpeg2000 | OpenJpeg, image_to_j2k, no parameter | 14165 | 100 |

It is therefore observed that:
Encodings using wavelets have a tendency to have size/quality performance that is close, while APE obtains results that are radically different;
In the case of image 1 (Graphics image), the APE is better in all cases;
In the case of image 2 (highly contrasted image), the APE is better on high qualities, encoding via wavelets for the strongest compressions;

In the case of image 3 (image with low contrast), encodings with wavelets are better in all cases.

In a first embodiment of the invention, the choice of the algorithm is taken after the colorimetric transformation, YCbCr in the examples shown.

Figure 7:
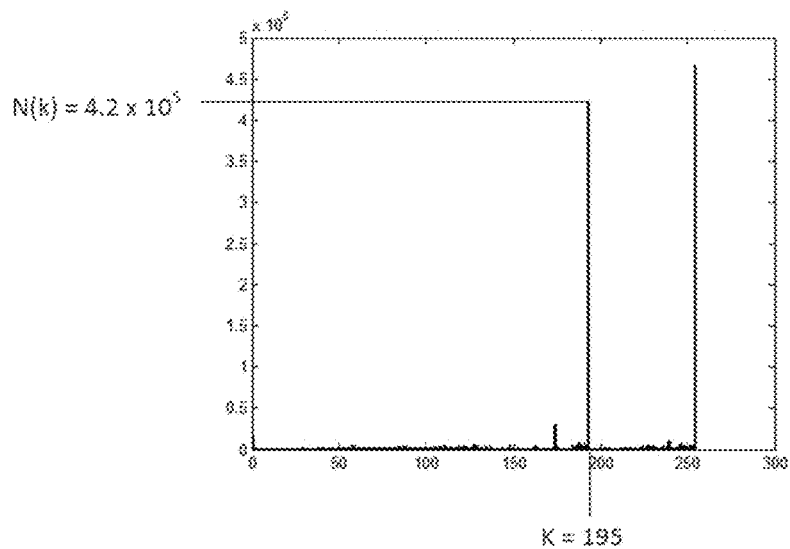

In order to choose the algorithm, the following is carried out:
the number of each one of the values on the most representative layer (ideally Y) is counted;
a histogram of the values is constructed such as shown in FIG. 7:
For each value k generally between 0 and 255, the number of times n(k) that this value is present in the layer is noted:
The number of pixels of the layer is therefore equal to the sum of the n(k):

$$N = \sum_{k=0}^{255} n(k)$$

The metric "FD2" provides an idea of the "peak" aspect of the histogram:

$$FD2 = \sum_{k=0}^{255} \left( \frac{\max[n(k) - 0.4*(n(k-1)+n(k+1)) - 0.1*(n(k-2)+n(k+2)), 0]}{N} \right)^2$$

The metric FD2 is carried out, over all or a portion of a layer of the image
The higher FD2 is, the more concentrated the values are

|      | Image1 | Image2  | Image3  |
|------|--------|---------|---------|
| FD2  | 0.18   | 0.00065 | 1.1E–06 |

It is therefore easily seen that the different types of images belong to different magnitudes, and that the formula is indeed discriminatory.
The image is separated in the following way:
FD2>0.075: Graphics image
FD2>$10^{-4}$: Highly contrasted image
Otherwise: Low-contrasted image
If FD2>0.075, a transform via differences is chosen, for example APE+RLE+zlib;
In the case of a highly contrasted image, a transform via differences is chosen, for example APE+RLE+zlib in lossless and near-lossless modes, and an encoding by wavelets in the other cases
In the case of a low-contrasted image, encoding by wavelets is carried out in all cases, for example of the JPEG or PGF type.
The type of image is stored in the file header
The inverse operations are carried out at decompression depending on the image type
In a second embodiment, the number of unique RGB colour triplets of the image is counted, which is reduced to the size of the image, preferably by dividing it by a coefficient according to the number of pixels of the image. When the number of unique RGB colour triplets of the image, reduced to the size of the image, is below a predefined threshold, the image is considered to be a graphics image; when it is above a second threshold, higher than the first, the image is considered to be a low contrast image. Between these two thresholds, the image is considered to be highly contrasted.

The same transformations are then applied as in the first embodiment:
In the case of a highly contrasted image, a difference transform is chosen, for example APE+RLE+ zlib in the lossless or near-lossless modes, an encoding by wavelets otherwise
In the case of a low-contrast image, an encoding by wavelets is carried out in all cases, for example of the JPEG or PGF type.
The type of image is stored in the file header
The inverse operations to decompression are carried out depending on the image type
More generally:
A method for compressing an image is therefore proposed, characterised in that:
calculating a level of hues of the image over at least all of one layer of the image,
depending on the type of hues over at least all of one layer, classifying the image in one of the following three classes:
a first class if the image is of a graphics type;
a second class if the image is of a highly contrasted type;
a third class if the image is of a weakly contrasted type; and,
choosing a compression processing type depending on the class of the image:
difference processing, if the image is of the first class;
frequency processing, preferably using wavelets, if the image is of the third class; and,
if the image is of the second class:
for lossless or low-loss compression, preferably using difference processing, and,
in the other cases preferably using frequency processing, preferably using wavelets.
Advantageously, the calculation is carried out over all of a layer that is most representative of the image (for example the layer Y)
Advantageously, these steps can be preceded by a colorimetric transformation, with loss or losslessly, on the input data. For example, a YCbCr transformation can be applied on the RGB input data.
In order to classify the image, with each hue corresponding to a hue value (preferably k=0-255 in the case of 8-bit layers), for each hue the number n(k) of pixels having this hue is calculated; then, an indicator of the concentration of the hues of the image around the value k is calculated, for example:

$$E(k)=n(k)-0.4(n(k-1)+n(k+1))-0.1(n(k-2)+n(k+2)),$$

by taking the difference between the number of pixels n(k) of the hue (k) considered and a proportion of those of its neighbours, preferably of its first-row (k−1 and k+1) and second-row (k−2 and k+2) neighbours, with the respective proportion being more reduced for the neighbours of the highest row, for example a proportion of 80% for each one of the first-row neighbours, i.e. the immediate neighbours of the hue (k) considered and of 20% for each one of the second-row neighbours, i.e. the immediate neighbours of the first-row neighbours.
Preferably, the sum of the proportions of the neighbouring values is equal to one. In the example shown, the sum of the proportions is effectively equal to 1 (0.4+0.4+0.1+0.1=1).

The indicator of the concentration of the hues around values k (E(k)) is then maintained higher than a certain threshold, preferably the positive indicators of concentration, i.e. Max(E(k),0), and each one of the indicators of concentration is reduced to the size of the image, for example to the total number (N) of pixels of the image.

Preferably, for better discrimination between the types of images, i.e. in order to facilitate classification, the result Max(E(k))/N is then raised to a power strictly greater than 1, preferably equal to 2.

A metric (FD) is then obtained by compiling these results for all of the layer, preferably by taking the sum of the results obtained as such for all of the hues of the layer. As such, in the example shown:

$$FD2 = \Sigma (\text{Max}(E(k))/N)^2,$$

for k varying from 0 to 255

The invention claimed is:

1. A method for compressing an image, comprising:
   calculating an index representing a distribution of light intensity values of pixels of at least all of one colour layer of the image;
   depending on a type of hues of the at least all of one colour layer of the image, classifying the image as one of the following three classes:
      a first class,
      a second class,
      a third class;
   and choosing a compression processing type depending on the class of the image, such that:
      if the image is of the first class, processing comprising a difference between the original value of a pixel of the colour layer and a decompressed value of an adjacent pixel of said layer,
      if the image is of the third class, processing by way of frequency processing, and
      if the image is of the second class, processing by way of frequency processing, unless the compression is a lossless or near-lossless compression, whereby processing comprises a difference between the original value of a of the colour layer and the decompressed value of a pixel adjacent to said layer.

2. The method according to claim 1, wherein the calculation is carried out on a colour layer that represents a luminosity of the image.

3. The method according to claim 2, wherein in order to classify the image, with each hue corresponding to a hue value (k=0-255), for each hue:
   a number n(k) of pixels that have the hue (k) is calculated; then,
   indicators of a concentration of hues (E(k)) are calculated by taking a difference between the number n(k) of pixels of the hue (k) considered and a proportion of those of its neighbours; then,
   the indicators of the concentration of the hues (E(k)) are maintained higher than a certain threshold, and each one of said indicators of concentration is reduced to a size of the image; and then,
   results obtained for each hue over all of the colour layer are compiled.

4. The method according to claim 3, wherein the respective proportion is more reduced for the neighbours of the highest row.

5. The method according to claim 4, wherein the first-row (k−1 and k+1) and second-row (k−2 and k+2) neighbours are used.

6. The method according to claim 3, wherein first-row (k−1 and k+1) and second-row (k−2 and k+2) neighbours are used.

7. The method according to claim 6, wherein the first-row (k−1 and k+1) and second-row (k−2 and k+2) neighbours are used by assigning a proportion of 80% for each one of the first-row neighbours.

8. The method according to claim 3, wherein a sum of the proportions of the neighbouring values is equal to one.

9. The method according to claim 3, wherein each retained indicator of concentration is then raised to a power that is strictly greater than 1.

10. The method according to claim 9, wherein each retained indicator of concentration is then raised to a power equal to 2.

11. The method according to claim 3, wherein the indicators of the concentration of the hues (E(k)) are maintained higher than positive indicators of concentration.

12. The method according to claim 11, wherein each one of the indicators of concentration is reduced to the total number (N) of pixels of the image.

13. The method according to claim 12, wherein results obtained for each hue over all of the colour layer are compiled by taking a sum of all the results obtained for the hues of the colour layer.

14. The method according to claim 2, wherein a colorimetric transformation is applied on input data of the image, before selecting a colour layer that most represents a luminosity of the image.

15. The method according to claim 14, wherein the input data is of RGB or BGR type, and the colorimetric transformation is a YCbCr transformation.

16. The method according to claim 2, wherein input data of the image is of YCbCr or YUV type, and the colour layer that represents the luminosity of the image is the colour layer Y.

17. The method according to claim 1, wherein the calculating of a level of hues of the image comprises calculating a number of unique RGB combinations over all of the image.

18. The method according to claim 17, wherein the number of unique RGB combinations over all of the image is divided by a coefficient according to the number of pixels of the image.

19. The method according to claim 17,
   wherein one of
      i) the number of unique RGB combinations over all of the image, or
      ii) the number of unique RGB combinations over all of the image divided by said coefficient,
   is compared to a set of thresholds, and
   wherein the image is classified according to the following rule:
      below a first threshold, the image is classified in the first class,
      above a second threshold, greater than the first, the image is classified in the third class, and
      between the first and the second threshold, the image is classified in the second class.

20. The method according to claim 1, wherein the frequency processing is performed using wavelets.

* * * * *